July 9, 1929.　　　O. O. APP　　　1,720,195
EXCAVATING DEVICE
Original Filed March 8, 1921　　5 Sheets-Sheet 1

INVENTOR.
Oliver O. App
BY
Rosenbaum Stockbridge Borst
ATTORNEYS.

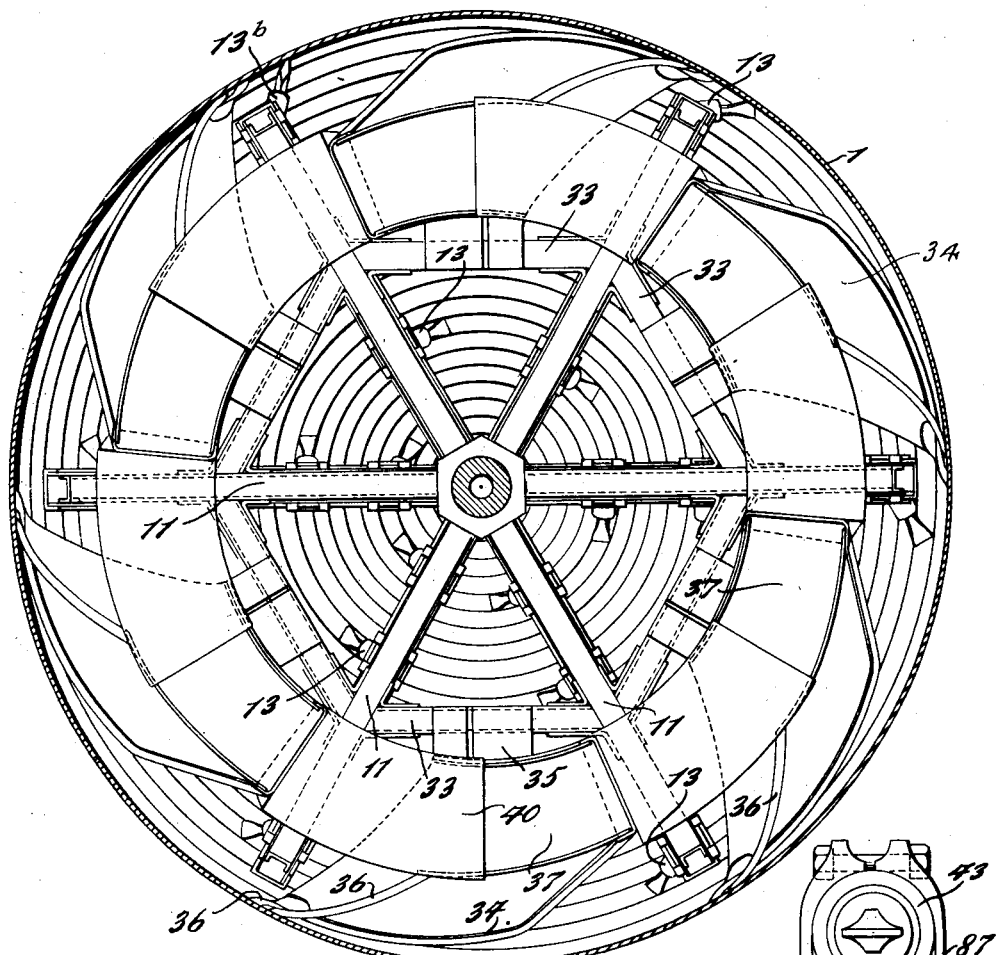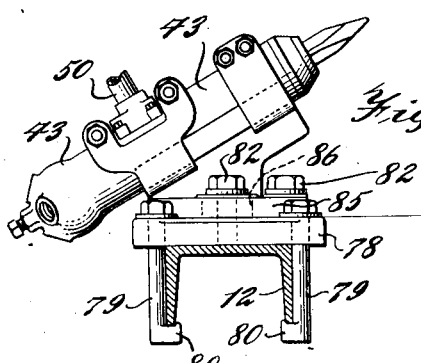

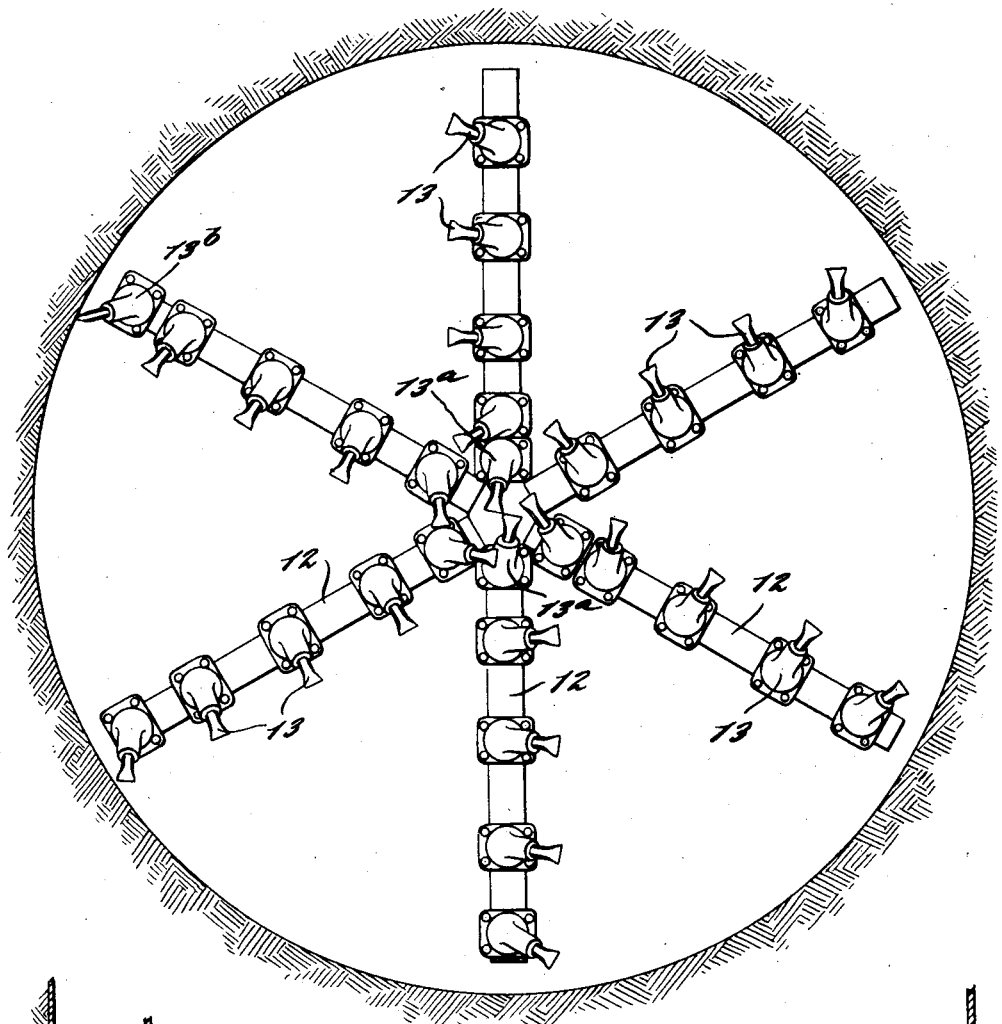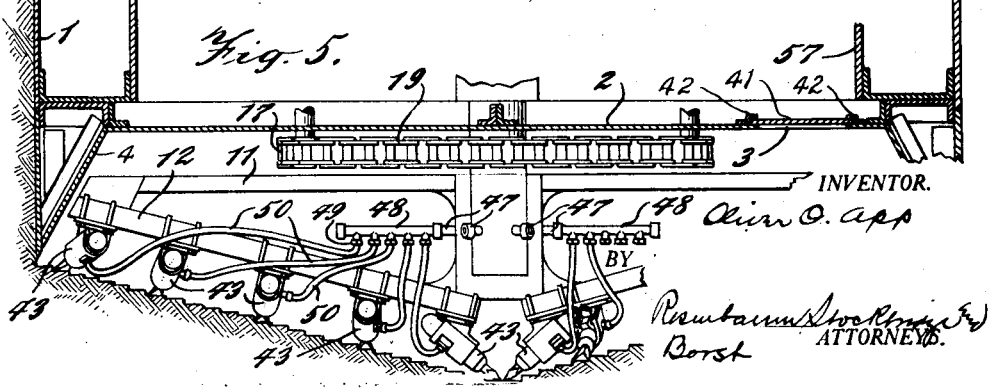

July 9, 1929.　　　　O. O. APP　　　　1,720,195
EXCAVATING DEVICE
Original Filed March 8, 1921　　5 Sheets-Sheet 5
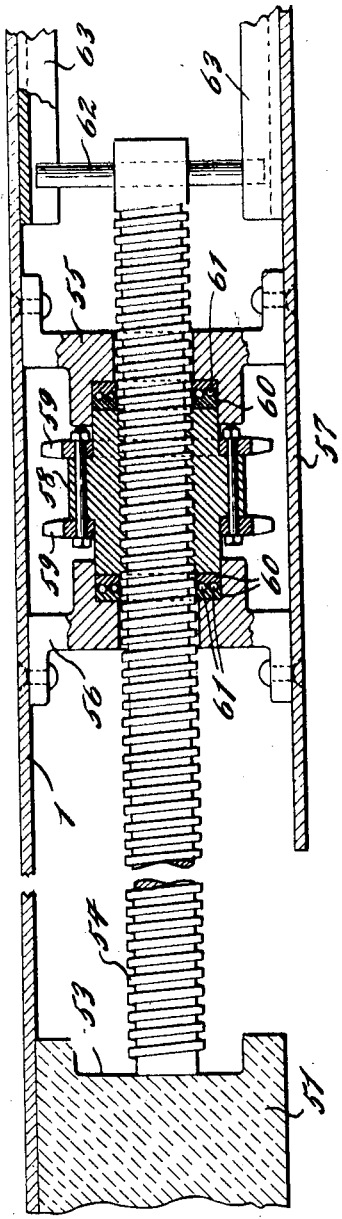
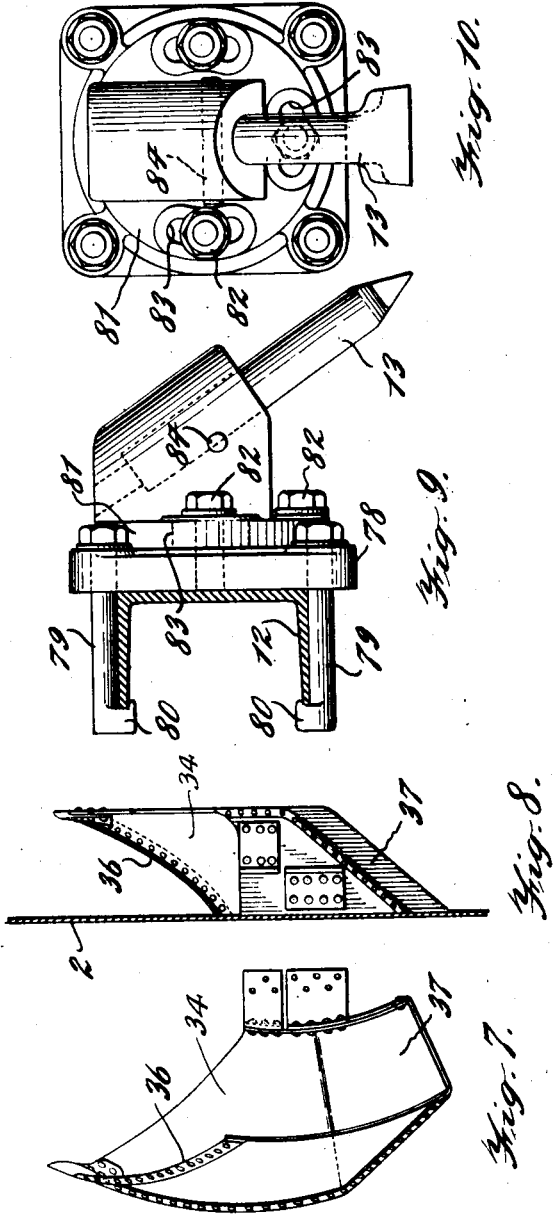

Patented July 9, 1929.

1,720,195

UNITED STATES PATENT OFFICE.

OLIVER O. APP, OF NEW YORK, N. Y., ASSIGNOR TO APP TUNNELING MACHINE CO., INC., A CORPORATION OF DELAWARE.

EXCAVATING DEVICE.

Application filed March 8, 1921, Serial No. 450,584. Renewed June 12, 1926.

This invention relates to excavating devices, and particularly to those which are employed in tunnelling. In prior devices of this kind where quicksand or water bearing strata are encountered, the tunnel in which the device is operating becomes filled with the water or sand so that further procedure with the work is not only difficult and expensive but dangerous to the operators. Under such conditions heretofore it has been necessary to work under compressed air in order to keep out the water and sand. The workmen cannot remain under high pressure for very long intervals and they must spend considerable time in being brought under the pressure and relieved therefrom to avoid physical injury to themselves. An object of my invention is to provide a tunneling device which can be used with perfect safety through all kinds of earth, mud, rock, and mixtures thereof, and without working in compressed air above atmospheric pressure, which largely eliminates the manual labor necessary in the tunneling operation, which propels itself forwardly at the proper speed, which enables the completion of the walls as the tunneling progresses, which is simple, durable, efficient, rapid, and relatively inexpensive. Other objects and advantages will be apparent from the following description and the novel features of my invention will be particularly pointed out in the claims.

In carrying out my invention I provide a tubular casing of substantially the size and shape of the bore and a short distance inwardly from the forward end I provide a shield or partition extending across the casing with a discharge aperture at one side and the necessary packed openings through which the operating mechanism for the excavating parts pass, the shield being otherwise closed. Forwardly of the shield I dispose the parts for breaking up the earth and rock and for automatically picking up the same as rapidly as broken up and discharging it through the aperture in the shield, the aperture being closed automatically except during the discharge of excavated material at intervals. An emergency door is provided for the aperture so that the shield can be made water tight at practically a moment's notice, and opened or closed as necessity demands. I also provide mechanism for engaging with the completed walls and mechanically propelling the casing and mechanism carried therein forwardly as rapidly as the excavation permits. The invention also contemplates various details and arrangements of parts which will be described and pointed out in detail hereinafter.

In the accompanying drawings:

Fig. 3 is a transverse sectional elevation of the same, immediately in front of the shield, and with the gearing removed;

Fig. 4 is a front end elevation of the same illustrating the arrangement of the excavating tools on the rotary head;

Fig. 5 is a fragmentary sectional elevation illustrating the piping connections when fluid actuated tools are employed;

Fig. 6 is a fragmentary elevation illustrating the position and details of one of the propelling jacks;

Fig. 7 is an end elevation of one of the shovels;

Fig. 8 is a side elevation of the same;

Fig. 9 is a side elevation of one type of tool and its mounting;

Fig. 10 is a plan of the same;

Fig. 11 is a side elevation of a fluid actuated tool, and its mounting; and

Fig. 12 is a front elevation of the same.

Figure 1:
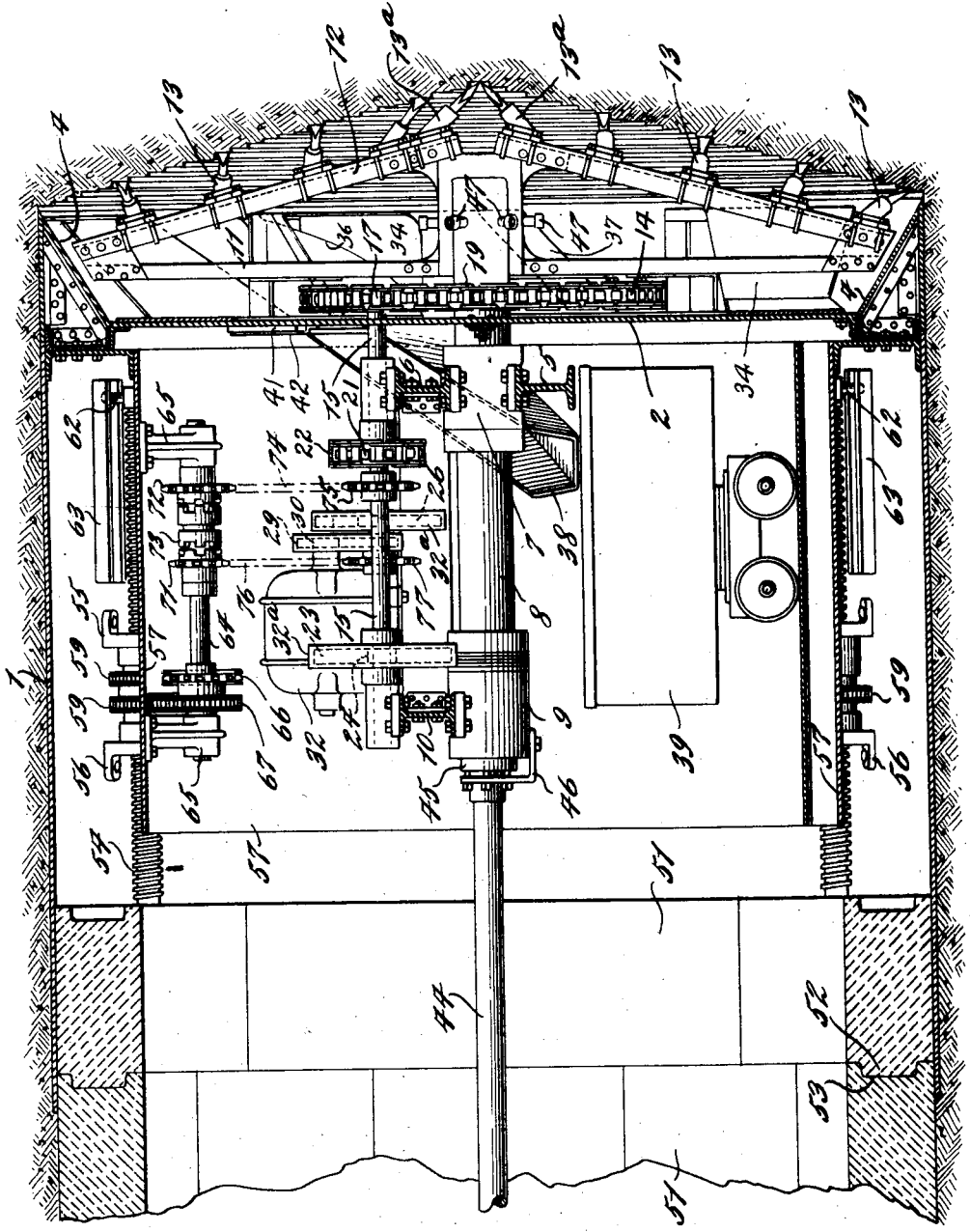
Fig. 1 is a vertical longitudinal section of a tunneling device constructed in accordance with my invention.
Figure 2:
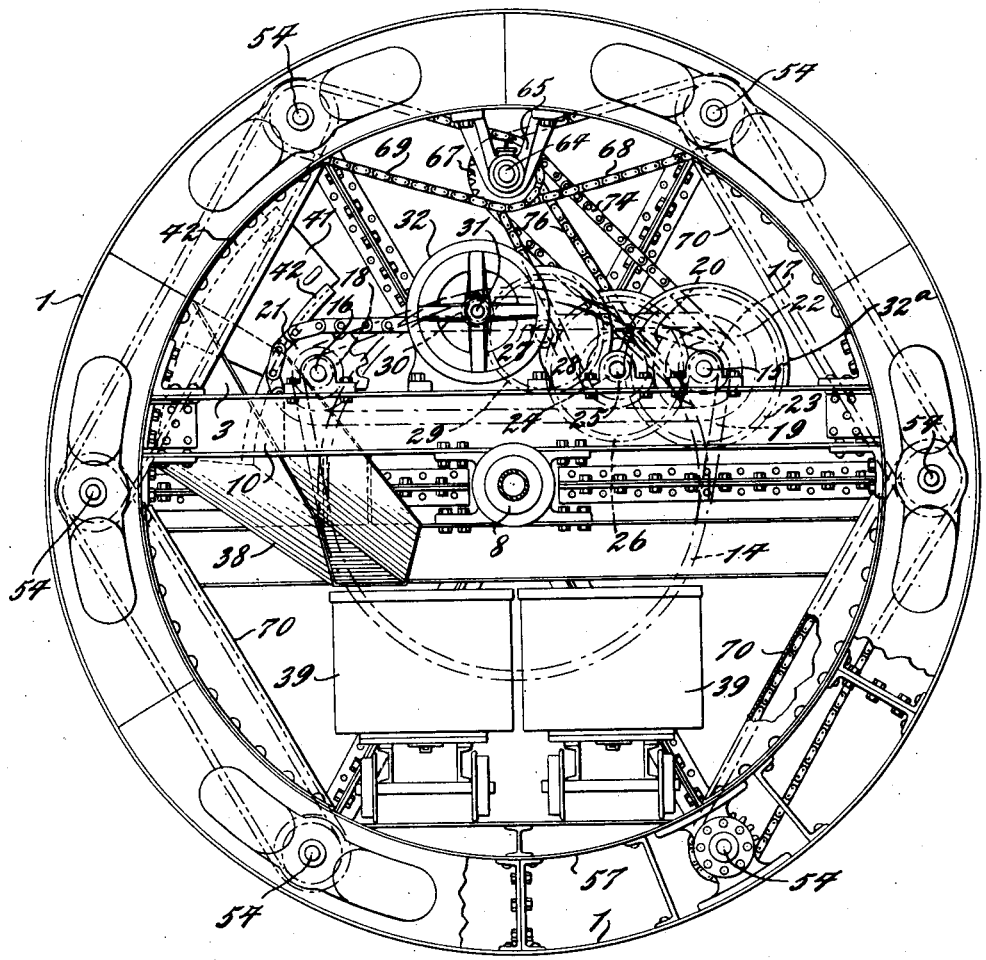
Fig. 2 is a rear elevation of the same.

In the illustrated embodiment of my invention, I provide a tubular casing 1 with open ends, and within the same and a short distance from the forward end with a transversely extending shield or partition 2, which divides the interior of the casing into two parts. The partition at one side and approximately midway of the height of the same is provided with an aperture 3 through which excavated material may be discharged in a manner to be hereinafter explained. The peripheral portion of the partition carries a wall 4 that is inclined to the casing wall and connects with the forward end of the casing. A pair of I-beams 5 and 6 extend transversely across the casing and serve to support a bearing element 7 of a rotary shaft 8, the shaft being also rotatably supported at another point of its length in a bearing element 9 that is supported by an I-beam 10 extending crosswise of the casing. The shaft extends through the partition 2 with suitable sealing means such as a stuffing box, and carries upon the end in advance of the partition a plurality of radially extending spokes, each composed of two arms 11 and 12. The forward arm 12 inclines rearwardly as well as outwardly and is joined at its outer end to the arm 11. A plurality of cutting or excavating tools 13 are arranged in spaced relation along each arm 12 of the radial spokes and the tools on each arm are staggered with respect to the tools on the other arms so that almost every tool cuts a definite and different step in the contacting surface being cut. The two innermost tools 13ª cut the same groove in the center of the surface contacted with, which groove is a small cylinder concentric with the axis of rotation of the shaft 8 and the furthest advanced. The other tools cut a stepped conical surface as indicated in Figs. 1 and 5 which surface is progressively formed as the excavating tools are advanced as well as rotated. The outermost tool 13ᵇ is disposed to cut peripherally of the excavation and trim the tunnel periphery to a size that will readily permit of the forward endwise movement of the casing as well as remove any ragged projections left on the peripheral wall by the other tools.

Upon the shaft 8 and, in the embodiment illustrated, forwardly of the partition, I fixedly mount a sprocket wheel 14 through which the shaft and tools can be driven. Rotatably supported upon the I-beams 6 and 10 and parallel with the shaft 8 are two shafts 15 and 16 which also extend through the shield and carry on the extending ends sprocket pinions 17 and 18 respectively. A sprocket chain 19 passes over each sprocket pinion and the sprocket wheel 14, the chain engaging with the sprocket wheel 14 on each side of a pinion before engaging with the other pinion. The shafts 15 and 16 also carry sprocket gears 20 and 21 to the rear of the shield, which gears are connected by a sprocket chain 22 so that the two shafts 15 and 16 will always rotate in unison and impart a driving force to the sprocket chain 19 at two spaced points. This arrangement insures that the wheel 14 will receive its turning torque at different points, permit the use of a lighter wheel, and due to less binding of the shaft 8 in its bearings will require but a minimum of driving power.

The shaft 15 carries a gear 23, that meshes with a pinion 24 carried by a shaft 25 which is rotatably supported upon the I-beams 6 and 10 in a position parallel to the shaft 15. The shaft 25 also carries a gear 26 that meshes with a pinion 27, carried by a shaft 28 that is rotatably supported in a position parallel with the shaft 25. The shaft 28 carries a gear 29 that meshes with a pinion 30 upon the driving shaft 31 of an operating motor 32. The gearing between the motor and the shaft 15 constitutes a reduction train which drives the shaft 15 at a lower rate than the motor but with an amplified turning torque, which effect is further increased by the driving connection between the shaft 15 and the shaft 8. Each gear and pinion in the reduction train is provided with a suitable protecting shield 32ª to prevent injury to the attendant by accidental contact with the gearing. Rotation of the shaft 8 causes rotary movement of the radial spokes carrying the tools 13 to disintegrate the material of the surface engaged and permit it to drop to the bottom of the excavation.

The arms 11 of the radial frames are connected by arms 33 which brace the same and serve as supports for the shovels 34. The shovels are provided with ears 35 by which they are connected to the bracing arms. Each shovel is preferably disposed in the opening between two frames, but a less number of shovels than the openings may prove to be sufficient in certain types of work. Each shovel is supported upon the spokes with its scooping edge 36 disposed along the inclined wall 4 and pointing in the normal direction of rotation of the shaft 8. The rear wall 37 of each shovel, which is opposite the scooping edge, inclines rearwardly and toward the partition 2 and the open side wall adjacent the partition fits closely thereto so that the partition will form a closure for the scoop or shovel during the major portion of its rotation. Each shovel preferably has a width substantially co-extensive with the width of the wall 4. As the material is broken up by the revolving head and tools each shovel in passing the lower part of the casing will collect or scoop up the loose earth and carry it therein as it passes up the side portion of the casing. The aperture 3 has the same radial distance from the shaft 8 as the shovels, and the rear wall 37 of the shovels, with the assistance of gravity, shifts the shovel contents against the partition 2 while rising. As the open side of the shovel passes the aperture 3, the shovel contents will pass therethrough and into a chute 38 that is secured to the rear face of the partition for conveying the discharged earth into a car 39 or other suitable conveyor.

It is sometimes necessary when excavating in earth containing quicksand, or water, that the aperture 3 be closed except during a discharging operation. Accordingly I provide upon each of the arms 11 a plate 40 which extends close to the partition, and rearwardly over the open side of the shovel for some distance so that as the head rotates the plates 40 will close the aperture 3 in passing except when the open side of a shovel is opposite the same. Where the pressure of the water encountered is too great, the aperture can be controlled by a manually operated or controlled closure 41 which in its simplest form consists of a plate that is guided for sliding movement in guides 42 on the partitions. When this plate is moved to close the aperture, the partition prevents passage of any water or sand into the working chamber to the rear thereof.

For excavating in soft earthy materials such as sand, muck, clay, or ordinary earth, the relatively stationary tools 13 may be advantageously employed, but where rock or very hard substances are likely to be encountered I prefer to substitute fluid actuated tools 43 instead of the relatively stationary tools. This arrangement is shown in Fig. 5. These tools are well known in the art and a detailed description here is believed to be unnecessary. These tools, however are self-acting and are actuated whenever the cutting part of the tool encounters resistance sufficient to force it backwardly into its casing to a given extent. A conduit 44 leading from the source of the compressed actuating fluid is connected to the end of the shaft 8 by means of a stuffing box 45 that is held against rotation with the shaft by an arm connecting the box to the bearing element 9. The shaft 8 is hollow and conducts the fluid to a point adjacent its forward end, where it discharges it through a plurality of outlets 47, one for each radial spoke. Each of these outlets has an extension 48, with a plurality of branches 49 that are connected through flexible conduits 50 with the tools 43 upon the arms 12. The tools therefore receive their power continuously during the rotation of the shaft 8.

A reinforcing wall of arcuate or sectional blocks 51 may be laid into the rear end of the casing so as to overlap therewith, and each peripheral row of blocks has a tongue portion 52 adapted to interlock with a complementary groove 53 in the abutting row for sealing the junction of the rows and for assisting in holding the blocks in place while each row is being laid. The casing carries a plurality of elements or jacks 54 around its inner periphery, which react upon the ends of the last row of blocks, or if the excavation is in rock and no reinforcing wall is employed, upon the walls of the excavation through the medium of suitable bracing (not shown). These elements or jacks are preferably screws that are rotatably supported each in a pair of aligned bearing elements 55 and 56, and the elements 55 and 56 extend between the outer casing wall 1 and a concentric inner casing wall 57. A pinion 58 comprising one or more sprockets 59 is threaded upon each screw element and disposed between the aligned bearing elements 55 and 56. Bearing plates 60 and ball or roller bearings 61 between the ends of the pinion and the elements 55 and 56 take up the end thrust of the screw element and pinion. Each screw element is provided with a transversely extending pin 62 that slides in one or more guide channels 63 carried by the casing walls 1 and 57, so that the screw is held against turning with the pinion but is permitted to slide lengthwise of the casings. Rotation of a pinion 58 will therefore force its screw endwise in one direction or the other dependent upon the direction of rotation of the pinions.

A counter shaft 64 is supported from the inner face of the casing 57 through hangers 65, and has fixed thereon a pair of sprocket wheels 66 and 67. One of these wheels 66 is connected by a chain 68 to one of the sprockets 59 of one of the adjacent pinions 58, and the other of the wheels 67 is connected by a chain 69 to a sprocket 59 of the other of the adjacent pinions 58. The extra sprocket of each of said pinions is connected by a chain to a sprocket of the next adjacent pinion 58, and so on around each half of the casing from the countershaft, whereby each screw 54 is driven with the countershaft, and the driving means is disposed around the periphery of the casing. In this manner the major portion of the interior of the casing is left free for the operating mechanism and the movement of the cars 39. Plates 70 extend segmentally across the interior of the inner casing to protect and guard the driving chains that extend from one screw to another.

The counter shaft 64 is provided with two spaced sprocket wheels, 71 and 72, rotatably and non-slidably carried thereon, each sprocket wheel having clutch teeth or sockets on the end face abutting the other. A clutch element 73 is slidably and non-rotatably carried on the counter shaft between the sprocket wheels 71 and 72 and has clutch teeth or sockets upon its ends which are complementary to those of the abutting ends of the sprocket wheels 71 and 72. Suitable means (not shown) is provided for shifting the element 73 into clutching engagement with either of the adjacent sprocket wheels, and out of clutching engagement with the other sprocket wheel. The sprocket wheel 72 is connected by a chain 74 to a sprocket wheel 75 that is fixed to the shaft 15, so that when the shiftable clutch element is in engagement with sprocket wheel 72, the rotation of the shaft 8 will cause a movement of the screws 54 in a direction to propel the casing forwardly through the excavated tunnel and to carry the cutting tools progressively forward in contact with the surface to be cut. The sprocket wheel 71 is connected by a chain 76 to a sprocket wheel 77 fixed upon the shaft 25 which is geared to shaft 15. Whenever the clutch element is in engagement with the sprocket wheel 71 the screws 54 will be operated in a direction away from the reinforcing wall so as to provide clearance for a new row of blocks to be laid in the casing. Since the shaft 25 rotates at a rate of speed higher than that of shaft 15 the backward movement of the jack to clear the walls and get a new abutment is more rapid than during the forward or propelling movement. The clutch element can also be placed in an intermediate position out of engagement with either sprocket wheel so as to render the jacks ineffective. The tools 13 may be secured to a base plate 78 that is clamped to the base of the channel iron constituting the arm 12 by means of bolts 79 with hooked ends 80 that engage with the free edges of the channel iron. The tool casing is provided with a flange 81 that is clamped to the plate 78 by cap screws 82 extending from the plate 78 through arcuate slots 83 in the flange 81. The arcuate slots permit of a limited adjustment of the tools on the arms 12 so as to position the tools in their most effective cutting positions. The shank of the cutting part of each tool is received within a socket of the casing and held against rotation or removal by suitable means such as a pin 84. The bases of the fluid operated tools also have flanges 85 with arcuate slots 86 through which the screws 82 pass when the fluid actuated tools are substituted for the relatively stationary tools 13. The casing of each fluid actuated tool is adjustably clamped in a socket in its base by split clamps 87 that have hooked ends 88 engaging with undercut portions of the base.

In use, the shaft 8 is driven from the motor 32 and the intermediate reduction gearing, and as rapidly as the earth is broken up by the revolving head and the tools, it drops to the bottom of the excavation where it is collected by the shovels, carried up by the side of the shield or partition and discharged through the aperture 3 into the chute 38 by which it is delivered to the cars 39 or other suitable means for removing it from the tunnel. The clutch element 73 can be shifted to connect the jacks to the motor and gear train for operation thereby to propel the casing and excavating mechanism slowly forward and maintain the tools in operative contact with the earth. Before the casing is propelled entirely away from the last row of blocks forming the reinforcing wall, the clutch element 73 will be shifted to reverse the jacks and cause them to move at a higher rate of speed away from the blocks so as to provide room for another row which will then be laid. The element 73 will then be shifted to drive the jacks toward the new row, and engagement therewith will cause a further forward endwise movement of the casing as before. As the casing leaves each row of blocks, cement may be forced under pressure through a hole (not shown) in one of the blocks into the space surrounding each row of blocks that is left vacant by the forward movement of the casing. The tools can be of the relatively stationary type as illustrated in Figs. 1, 4, 9 and 10, or of the fluid actuated type as illustrated in Figs. 5, 11, and 12. The latter are preferable where stone or rock is likely to be encountered since the fluid pressure can be turned off and the tools utilized as ordinary excavating tools, but since they are self acting whenever they encounter enough resistance to force them back into their casing it is not necessary that the fluid supply be discontinued. The tools of both types are interchangeable on the plates 7 and 8 so that they can be readily interchanged at any time. The plates 40 close the aperture 3 except when a shovel is in discharging relation therewith, but the aperture can also be closed to any desired extent by means of plate 41. There is no danger to the operatives when water or quicksand is encountered since the partition protects the workmen. While some water would pass through the aperture with the muck or earth, the closing of the aperture except during the discharge of the earth therethrough will prevent the flooding of the compartment to the rear of the casing and make the use of compressed air therein to keep out the water unnecessary. The aperture can be closed by the plate 41 when the excavation is not taking place or the work is stopped for any reason. While in practice, sections of the partition might be made removable to allow access to the tools and shovels for repairs or interchanging, I have for the purpose of simplicity illustrated the partition without this feature.

It will be obvious that with minor changes in the shovels and chute, the excavating device herein described and illustrated can also be used for the excavation of vertical and inclined tunnels. It will also be obvious that various other changes in the details and arrangements may be made within the principle and scope of the invention.

I claim:

1. In an excavating device, the combination of a tubular casing, a partition shield extending across the casing intermediate its ends and having an aperture therein, excavating mechanism in front of the shield for loosening the material and discharging it through the aperture, means extending through the shield for controlling the excavating mechanism from the rear of the shield, and a manually operated closure for said aperture operable from behind the shield.

2. In an excavating device, the combination of a tubular casing, a partition shield extending transversely across the casing and having an aperture therein, excavating mechanism in front of the shield for loosening the material to be excavated and discharging it through the aperture, means passing through the shield for controlling the operation of the excavating mechanism from the rear of the shield, and means for closing the aperture in the shield.

3. In an excavating device, the combination of a tubular casing, a partition shield extending transversely across the casing and having an aperture therein, a rotary head in front of the shield, means extending through the shield for operating the head, excavating tools carried by the head for loosening the material to be excavated; means also carried by the head for collecting the loosened material and discharging it through the aperture in the shield, and means for manually closing the aperture.

4. In an excavating device, the combination of a tubular casing, a partition shield extending transversely across the casing and having an aperture therein, a rotary head in front of the shield, means carried by the head in front of the shield for loosening the material to be excavated; and means also carried by the head for collecting the loosened material and discharging it through the aperture in the shield and for closing the aperture when not in a discharging condition.

5. In an excavating device, the combination of a tubular casing, a partition shield extending transversely across the casing and having an aperture therein, a rotary head in front of the shield, means extending through the shield for operating the head, excavating tools carried by the head for loosening the material to be excavated, and means also carried by the head for collecting the loosened material and discharging it through the aperture in the shield and for closing the aperture when not in a discharging condition, and means for manually closing the aperture.

6. In an excavating device, the combination, of a tubular casing, an internal partition shield extending transversely thereof and having an aperture therein, excavating mechanism in front of the shield, means within the casing and operable through the shield for driving the mechanism to loosen the material to be excavated and discharge it through the aperture of the shield, and means driven by the mechanism driving means for propelling the casing forwardly as rapidly as excavation permits.

7. In an excavating device, the combination, of a tubular casing, an internal partition shield extending transversely thereof and having an aperture therein, excavating mechanism in front of the shield, means within the casing and operable through the shield for driving the mechanism to loosen the material to be excavated and discharge it through the aperture of the shield, and means driven by the mechanism driving means and engaging with the completed walls of the excavation for propelling the casing forwardly as rapidly as the excavation permits.

8. In an excavating device, the combination of a tubular casing, an internal partition shield extending transversely thereof and having an aperture therein, a hollow rotary shaft extending through the partition, a head carried by the shaft in front of the partition, fluid operated cutting tools carried by the head and connected to said hollow shaft for a source of fluid supply, a connection for supplying fluid under pressure to said hollow shaft, means for rotating said head to cause the tools to disintegrate the material to be excavated, and means for collecting the disintegrated material and discharging it through the aperture.

9. In an excavating device, the combination, of a tubular casing, an internal partition shield extending transversely thereof and having an aperture therein, a hollow rotary shaft extending through the partition, a head carried by the shaft in front of the partition, fluid operated cutting tools carried by the head and connected to said hollow shaft for a source of fluid supply, a connection for supplying fluid under pressure to said hollow shaft, means for rotating said head to cause the tools to disintegrate the material to be excavated, a shovel carried by the head for scooping up the material disintegrated by the tools and discharging it through the aperture in the shield.

10. In an excavating device the combination of a tubular casing, an internal shield extending transversely of the casing and having an aperture therein, a rotating head in front of the shield, tools carried thereby for disintegrating the material to be excavated, a shovel carried by the head for collecting the disintegrated material and discharging it through the aperture in the shield.

11. In an excavating device the combination of a tubular casing, an internal shield extending transversely of the casing and having an aperture therein, a rotating head in front of the shield, tools carried thereby for disintegrating the material to be excavated, a plurality of shovels carried by the head for collecting the disintegrated material and discharging it through the aperture in the shield, and means carried by the head for closing the aperture when a shovel is not in discharging relation thereto.

12. In an excavating device, the combination of a tubular casing, an internal shield extending transversely of the casing and having an aperture at one side thereof and approximately midway between the top and bottom of the casing, a rotary device in front of the shield for disintegrating the material to be excavated, a shovel carried by the rotary device at a radial distance equal to that of the aperture and with an open wall in contact with the shield, the collecting edge of the shovel being disposed in the direction of movement and normal to its radius of movement, the opposite end wall being inclined backwardly and toward the open wall whereby as the shovel in its rotation passes along the bottom it will collect therein disintegrated material and carry it up therewith and against the shield and discharge it through the aperture in passing.

13. In an excavating device the combination of a tubular casing, a rotary head in one end of the casing, excavating tools carried by said head for cutting a tunnel permitting the passage of the casing, an interiorly transversely disposed wall in said casing, a shovel carried by the head and co-operating with said wall and casing to collect the earth broken up by the tools and discharge it upon the other side of the said wall.

14. In an excavating device, the combination of a rotating head, a gear carried by the head, a pair of pinions in the plane of, but spaced circumferentially around the gear, a driving chain passing around said pinions and gear, said chain engaging with the gear on each side of a pinion before engaging with the other pinion, driving means connecting the pinions, and means for driving one of the pinions.

15. In an excavating device, the combination of a tubular casing, mechanism supported by the casing for excavating a passage for the casing in advance thereof, means carried by the casing and reacting upon the reinforcing wall of the passage being progressively laid within the casing for propelling the casing and excavating mechanism forwardly through the passage excavated, common driving means for said mechanism, and means connecting the first named means and said driving means enabling operation of the former selectively in a direction to propel the casing along or in the opposite direction to provide a place for a new layer of reinforcing wall upon which it can again react.

16. In an excavating device, the combination of a tubular casing, mechanism supported by the casing for excavating a passage for the casing in advance thereof, driving means therefor, a plurality of screw jacks arranged around the inner periphery of the casing and reacting upon the reinforcing wall of the passage, being progressively laid into the casing to propel the casing and mechanism forwardly through the passage excavated, and means including a manually controlled clutch adapted to connect the jacks to the driving means to operate the jacks.

17. In an excavating device the combination of a tubular casing, mechanism supported by the casing for excavating a passage for the casing in advance thereof, driving means therefor, a plurality of screw jacks arranged around the inner periphery of the casing and reacting upon the reinforcing wall of the passage being progressively laid into the casing to propel the casing and mechanism forwardly through the passage excavated, and means including a manually controlled double clutch device for connecting the jacks to the driving means for operation selectively in a direction to propel the casing or in a direction to provide clearance for a new layer of the reinforcing wall.

18. In an excavating device the combination of a tubular casing, mechanism supported by the casing for excavating a passage for the casing in advance thereof, driving means therefor, a plurality of screw jacks arranged around the inner periphery of the casing and reacting upon the reinforcing wall of the passage being progressively laid into the casing to propel the casing and mechanism forwardly through the passage excavated, and means for operating the jacks selectively in either direction to propel the casing or to provide clearance for a new layer of reinforcing wall.

19. In an excavating device the combination of a tubular casing, mechanism for excavating a passage for the casing, a plurality of jacks arranged around the periphery of the casing and reacting upon the reinforcing wall of the passage being progressively laid into the casing for propelling the casing forwardly through the passage excavated, a driving connection to two of said jacks, and means extending along the periphery of the casing for driving the remaining jacks from said two jacks.

20. In an excavating device the combination of a tubular casing, excavating mechanism carried thereby for excavating a passage for the casing, jacks carried by the casing for propelling the casing forwardly through the passage excavated, a source of power, a reduction train connecting the source of power to said mechanism to operate the same, means for connecting selectively different gears of the reduction train to the jacks to operate the jacks in either direction and at different speeds.

21. In an excavating device, the combination of a tubular casing, a partition shield extending transversely across the casing and having an aperture therein, a rotary head in front of the shield, means for rotating the head, means carried by the head in front of the shield for loosening the material to be excavated, scoops carried by the head for collecting the loosened material and confining it against the partition shield until the scoops reach the aperture and then discharging it through the aperture, and plates carried by the head, flat against the partition shield and extending from the rear of each scoop to the forward edge of the discharge end of the next scoop whereby the aperture is closed whenever a scoop is not in discharging relation therewith.

22. In an excavating device, the combination of a tubular casing, a partition shield extending transversely across the casing and having an aperture therein, a rotary head in front of the shield, means for rotating the head, means carried by the head for loosening the material to be excavated, scoops carried by the head for collecting the loosened material and confining it against the partition shield until the scoops reach the aperture and then discharging it through the aperture, plates carried by the head, flat against the partition shield and extending from the rear of each scoop to the forward edge of the discharge end of the next scoop whereby the aperture is closed whenever a scoop is not in discharging relation therewith, and a safety slide for said aperture operative to close the aperture entirely.

23. In an excavating device, the combination of a tubular casing, a partition shield extending transversely across the casing and having an aperture therein, a rotary head in front of the shield, means extending through the shield for operating the head, excavating tools carried by the head for loosening the material to be excavated and means also carried by the head for collecting the loosened material and discharging it through the aperture in the shield.

In witness whereof, I hereunto subscribe my signature.

OLIVER O. APP.